US005116093A

United States Patent [19]

Burns

[11] Patent Number: 5,116,093

[45] Date of Patent: May 26, 1992

[54] RESCUE DEVICE

[76] Inventor: O. Edward Burns, P.O. Box 4039, Scottsdale, Ariz. 85261

[21] Appl. No.: 633,099

[22] Filed: Dec. 20, 1990

Related U.S. Application Data

[63] Continuation-in-part of Ser. No. 386,421, Jul. 28, 1989, abandoned.

[51] Int. Cl.[5] .......................... A62B 37/00; B25J 1/00

[52] U.S. Cl. ................................. 294/19.1; 294/23.5; 294/24

[58] Field of Search ........................ 294/1.1, 2, 15, 17, 294/19.1, 24, 23.5, 26, 50.6, 55.5, 61, 66.1, 86.1, 120, 121, 125, 126; 5/81 R, 83, 84; 7/158, 161, 167, 169, 170; 15/104.32; 43/6; 119/151-154; 182/20, 129, 137, 151, 189, 230; 441/80, 82, 83, 136

[56] References Cited

U.S. PATENT DOCUMENTS

| | | | |
|---|---|---|---|
| 172,891 | 2/1876 | Poole | 294/23.5 |
| 209,957 | 11/1878 | Castle | 294/23.5 |
| 597,987 | 1/1898 | Krabach | 294/23.5 |
| 726,826 | 4/1903 | Rasmussen | 294/66.1 |
| 885,442 | 4/1908 | Coogan | 294/126 X |
| 927,546 | 7/1909 | Johnston | 294/23.5 |
| 1,128,245 | 2/1915 | Hamrin | 294/23.5 |
| 1,457,727 | 6/1923 | Crocker | 294/23.5 |
| 1,465,175 | 8/1923 | Pratt | 294/23.5 |
| 1,571,220 | 2/1926 | Wickersham | 294/23.5 |
| 1,665,988 | 4/1928 | Smith | 294/19.1 X |
| 1,712,652 | 5/1929 | Dunn | 294/23.5 |
| 1,731,654 | 10/1929 | Foster | 294/23.5 |
| 2,011,896 | 8/1935 | Grace | 294/23.5 |
| 2,562,794 | 7/1951 | Kalish | 294/24 |
| 2,579,864 | 12/1951 | Rooker | 294/66.1 |
| 3,004,362 | 10/1961 | Day | 294/61 X |
| 3,330,588 | 7/1967 | Alfano | 294/1.1 X |
| 3,333,881 | 8/1967 | Hollinger | 294/19.1 |
| 4,004,539 | 1/1977 | Wesson | 294/24 X |
| 4,230,357 | 10/1980 | Bosch et al. | 294/19.1 |
| 4,580,825 | 4/1986 | Johnson | 294/24 |

*Primary Examiner*—Johnny D. Cherry
*Attorney, Agent, or Firm*—Tod R. Nissle

[57] ABSTRACT

Apparatus for moving an individual. The apparatus includes a fitting attached to one end of a pole. The fitting is shaped and dimensioned to engage an individual's clothing by being pressed against the clothing and rotated.

4 Claims, 3 Drawing Sheets

FIG. 1
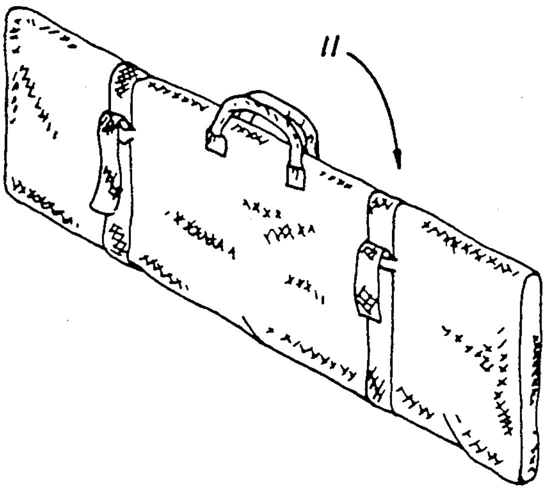
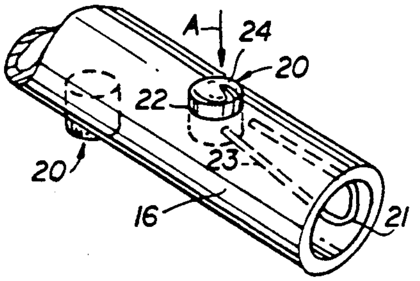
FIG. 5
FIG. 2
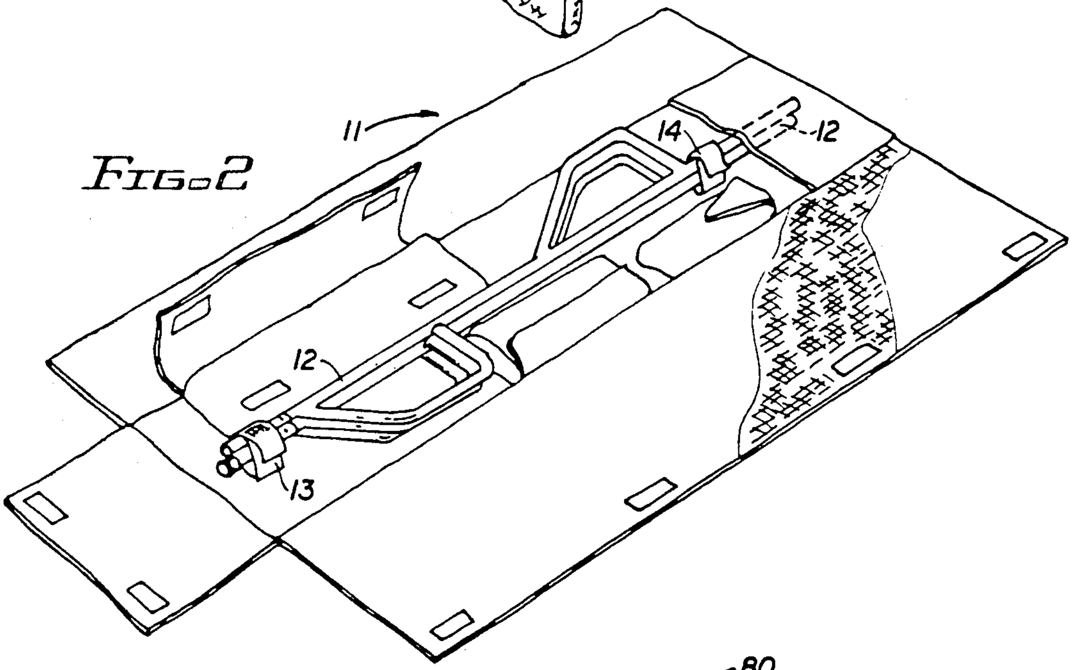
FIG. 3
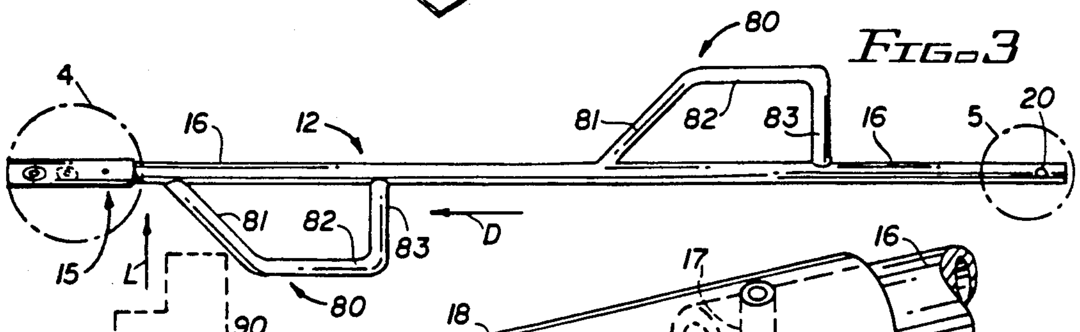
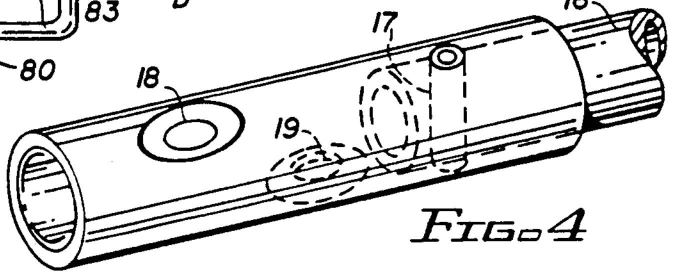
FIG. 4

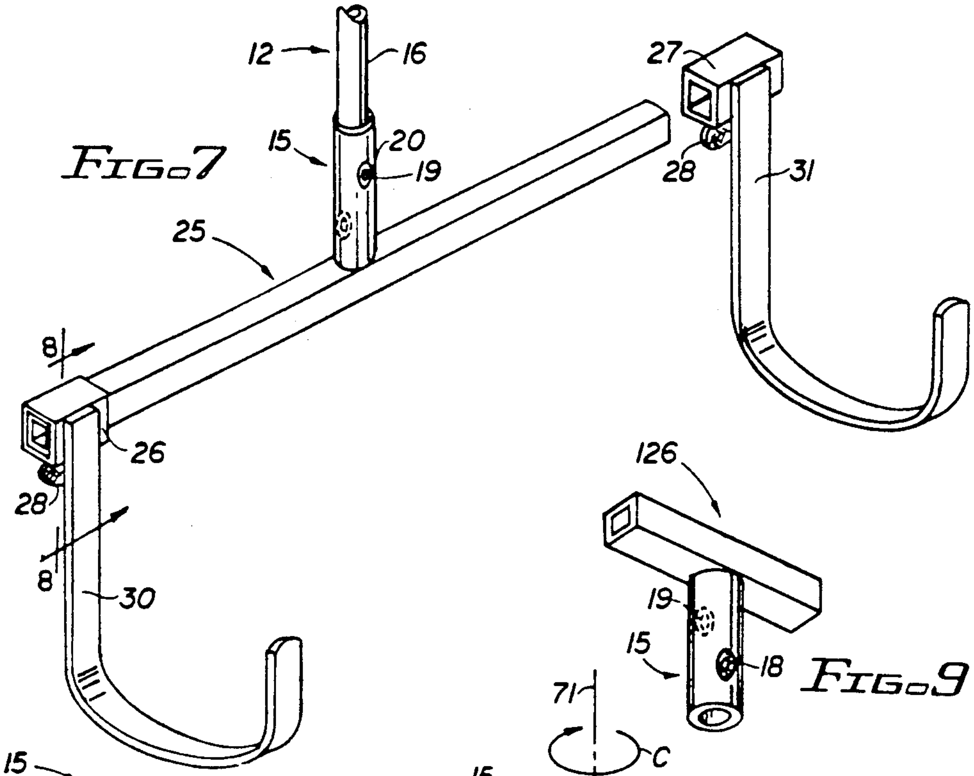
FIG. 7
FIG. 9
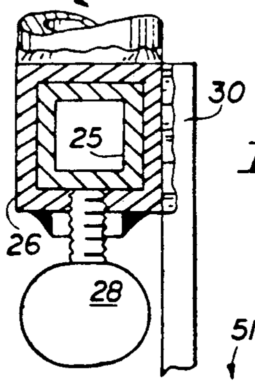
FIG. 8
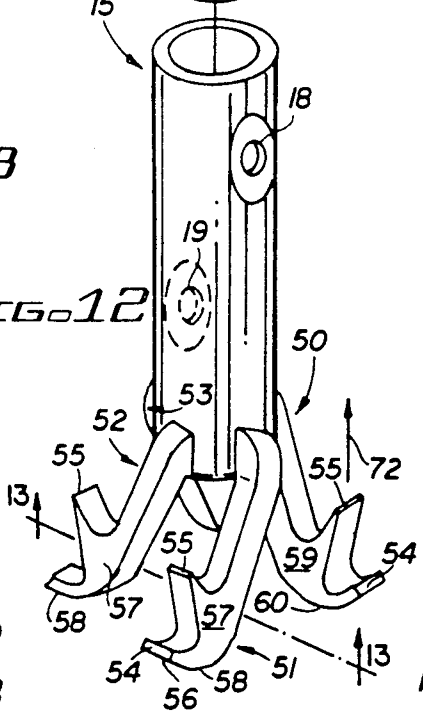
FIG. 12
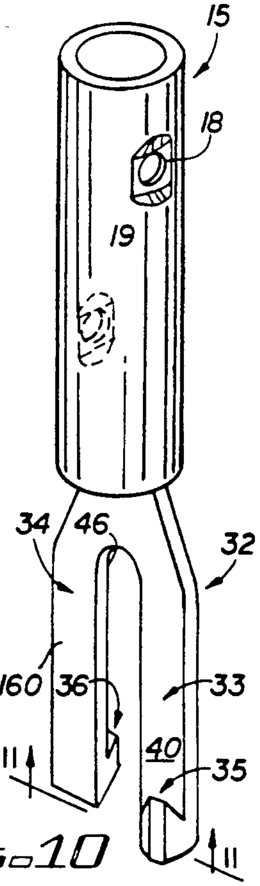
FIG. 10
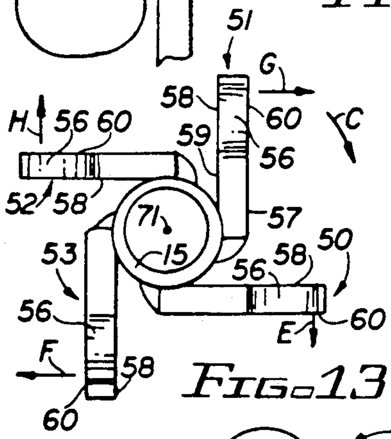
FIG. 13
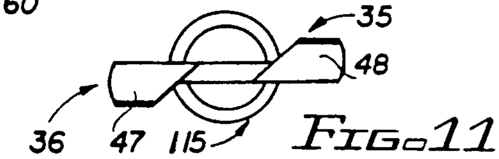
FIG. 11

RESCUE DEVICE

This application is a continuation-in-part of my application Ser. No. 386,421, filed Jul. 28, 1989, for "RESCUE DEVICE", now abandoned.

This invention pertains to apparatus for moving an individual.

More particularly, the invention pertains to apparatus for engaging the clothing of and lifting or lowering an unconscious or incapacitated individual.

In a further respect, the invention pertains to apparatus including a fitting which is shaped and dimensioned to engage an individual's clothing by being pressed against the clothing and rotated.

The rescue of an individual trapped in a narrow deep hole or confine is often difficult. For instance, in cases where a small child has fallen down a relatively deep, narrow hole in the ground, a typical method of rescue is to dig another vertical rescue shaft which is spaced away from and parallel to the hole in which the small child is trapped. Once the vertical rescue shaft is excavated to a depth equal to that of the child, a horizontal rescue shaft is dug which interconnects the narrow hole and vertical rescue shaft and which enables the child to be pulled free. One of the risks involved in such a rescue procedure is that excavating the rescue shafts can require considerable time, during which the child may expire or experience further injury. In addition, excavation of the vertical and horizontal rescue shafts must be done carefully lest the narrow hole in which the child is trapped collapses and buries the child.

Another instance in which rescue is difficult occurs when an incapacitated individual is at a location which rescue personnel can not readily approach. For example, when an individual lies unconscious in a burning building, rescue personnel often can not reach the individual.

Accordingly, it would be highly desirable to provide improved apparatus which would facilitate the ready rescue of incapacitated individuals trapped in small, deep holes or in other confines which do not permit a rescuer to readily approach the trapped individual.

Therefore, it is a principal object of the invention to provide improved apparatus for extricating a disabled individual from a position or location in which the individual is not readily approached and manually grasped by a rescuer.

Another object of the invention is to provide improved rescue apparatus which can be extended over a selected distance and can grip the clothing of the individual by simply positioning one end of the apparatus against the clothing of the apparatus and rotating said end.

A further object of the invention is to provide improved rescue apparatus of the type described which can also be adapted to engage the clothing of an individual when the apparatus is pressed against the clothing by moving the apparatus either in a direction parallel or perpendicular to the individual's body.

These and other further and more specific objects and advantages of the invention will be apparent to those skilled in the art from the following detailed description thereof, taken in conjunction with the drawings, in which:

FIG. 1 is a perspective view illustrating a carrying case for apparatus constructed in accordance with the invention;

FIG. 2 is a perspective view illustrating the carrying case of FIG. 1 after it has been opened to exhibit apparatus carried therein;

FIG. 3 is a top view of a section of an extension pole utilized in the invention;

FIG. 4 is an enlarged perspective view of one end of the extension pole of FIG. 3;

FIG. 5 is a perspective view of the other end of the extension pole of FIG. 3;

FIG. 7 is a perspective view illustrating a grappling hook attachment of the apparatus of the invention;

FIG. 8 is a section view of the apparatus of FIG. 7 taken along section line 8—8 thereof and illustrating interior construction details thereof;

FIG. 9 is a perspective view illustrating a T-shaped fitting for the extension pole of FIG. 3;

FIG. 10 is a perspective view illustrating a clothes engaging fitting for the extension pole of FIG. 3;

FIG. 11 is a bottom view of the fitting of FIG. 10 taken along section line 11—11 thereof;

FIG. 12 is a perspective view illustrating another clothes engaging fitting for the extension pole of FIG. 3;

FIG. 13 is a bottom view of the fitting of FIG. 12 taken along section line 13—13 thereof;

Figure 14:
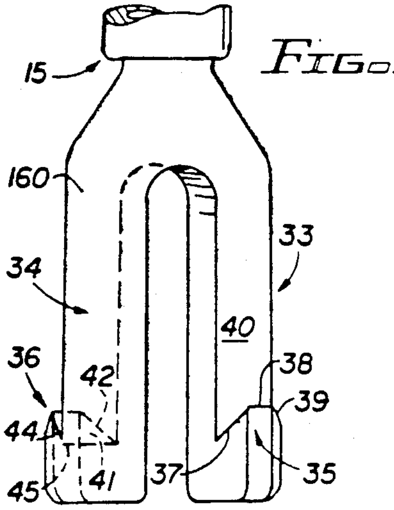
FIG. 14 is a front view of the fitting of FIG. 10.

Briefly, in accordance with my invention, I provide improved apparatus for applying from a first location a pulling force on a clothed individual at a second location. The apparatus includes an elongate member extending from the first to the second location and including a first end at the first location and a second end at the second location; clothing engagement means attached to the second end and including at least one foot shaped and dimensioned, when positioned adjacent and contacting said clothing and rotated, to wrap portions of the clothing over the foot to engage the foot such that when a force is applied to the first end, the force acting in a direction away from the individual, the engagement means exerts a pulling force on the clothing and the individual; and, means for applying the force to the second end of the elongate member.

Turning now to the drawings, which depict the presently preferred embodiments and best mode of the invention for the purpose of illustrating the practice thereof and not by way of limitation of the scope of the invention and in which like reference characters represent corresponding elements throughout the several views, FIG. 1 illustrates cloth or canvas carrying case 11. Carrying case 11 is illustrated in FIG. 2 after it has been opened. Elongate pole members 12 are secured in carrying case 11 by Velcro® straps 13, 14. As shown in FIG. 3, one end of elongate pole member 12 includes collar 15. Collar 15 is, as depicted in FIG. 4, fixedly secured to pole 16 with pin 17. Apertures 18 and 19 are formed through hollow, cylindrical collar 15. The other end of pole 16 is provided with spring loaded nubs 20. In FIG. 5, spring 21 resiliently resists the downward sliding displacement in the direction of arrow A of nub 20 through circular aperture 22. Aperture 22 is formed through the wall of hollow, cylindrical pole 16. End 23 of spring 21 is fixedly secured in the portion of nub 20 which is normally positioned inside pole 16. When a sufficient downward force is applied to nub 20 in the direction of arrow A, nub 20 is downwardly displaced until tip 24 is flush with the outer cylindrical surface of pole 16. When the downward force represented by arrow A is released, resilient spring 21 causes nub 20 to move upwardly in a direction opposite arrow A to the position illustrated in FIG. 5. The end of pole 16 equipped with nub 20 can be slidably received by collar 15 mounted on another pole 16, or can be slidably received by a collar 15 attached to any of a variety of extrication tools utilized in the practice of the invention. For example, the use of collar 15 with various extrication tools is illustrated in FIGS. 7, 9, 10, and 12.

In FIGS. 7 and 9 collar 15 is connected to elongate square bars 25 and 126, respectively. Bar 126 is substantially shorter than bar 25. Nubs 20 on one end of a pole member 12 are received by apertures 18 and 19 formed in collar 15. In FIG. 7, bar 25 slidably receives square sleeves 26 and 27. After sleeves 26 and 27 are slid along bar 25 to a desired position, set screws 28 are used to secure sleeves 26 and 27 in position on bar 25. U-shaped hooks 30 and 31 are fixedly secured to sleeves 26 and 27, respectively. FIG. 8 illustrates the use of set screw 28 to secure sleeve 26 in position on bar 25.

As shown in FIG. 10, collar 15 can also be fixedly secured to fork 32. Tangs or feet 33 and 34 of fork 32 are provided with teeth 35, 36 respectively. As illustrated in FIGS. 10 and 14, tooth 35 includes a triangular sloped inner surface bounded by edges 37, 38, 39 and by the line along which the inner sloped triangular surface terminates at the lower portion of flat planar surface 40 of tang 33. Tooth 36, in similar fashion, includes an inner sloped triangular surface 41 bounded by edges 42, 43, 44 and by the line 45 along which surface 41 intersects with flat planar surface 46 of tang 34. As shown in FIG. 11, the bottom surfaces 47 and 48 of teeth 36, 35, respectively, are partially rounded.

In FIG. 12, feet 50, 51, 52, and 53 are fixedly secured to collar 15. The lower end of each foot 50 to 53 is provided with upwardly projecting teeth 54 and 55. The bottom surface 56 of each foot 50 to 53 coterminates with planar side wall 57 along arcuate line or edge 58. Curved bottom surface 56 of each foot 50 to 53 coterminates along arcuate line or edge 60 with flat planar side wall 59.

Figure 17:
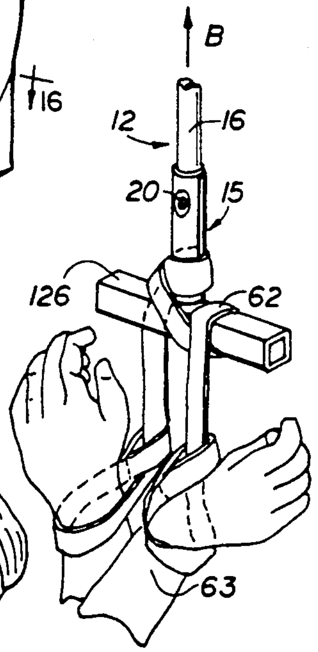
FIG. 17 is a perspective view illustrating the mode of operation of the fitting of FIG. 9; and, FIG. 18 is a side elevation view illustrating the mode of operation of the grappling hook attachment of FIG. 7.

Utilization of the extrication tool of FIG. 9 is depicted in FIG. 17. Strap 62 is wrapped around collar 15 and bar 126 and is looped around the wrists 63 of an individual. Pole 16 is then displaced or pulled in the direction of arrow B to pull the wrists, and consequently the body, of the individual.

Figure 15:
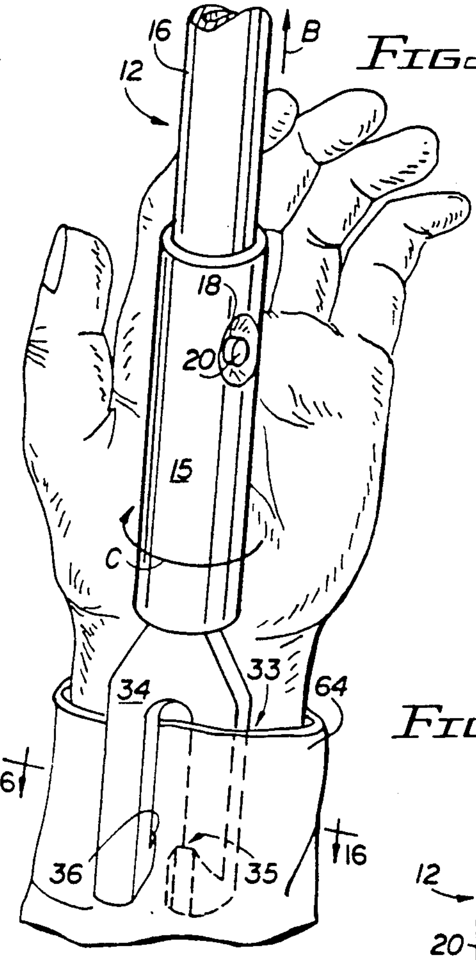
FIG. 15 is a perspective view of the shirt sleeve and wrist of an individual illustrating the mode of operation of the fitting of FIG. 10.
Figure 16:
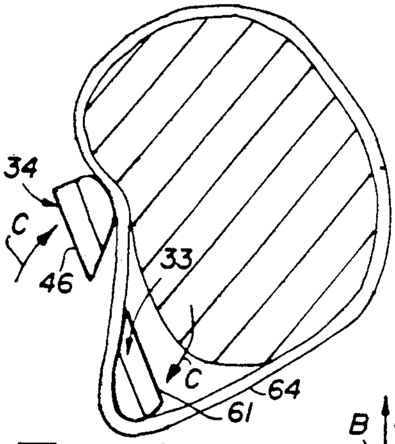
FIG. 16 is a section view of FIG. 15 taken along section line 16—16 thereof and illustrating the mode of operation of the fitting of FIG. 10.

Use of the extrication tool of FIGS. 10, 11, and 14 is illustrated in FIGS. 15 and 16. Tang or foot 33 is positioned inside the shirt sleeve 64 while tang 34 is positioned outside of sleeve 64. Pole 16 and tangs 33 and 34 are rotated in the manner indicated by arrows C in FIG. 15. The rotation of tangs 33 and 34 causes edges 37–39, 42–44 of teeth 35 and 36 to engage sleeve 64 such that when pole 16 is pulled or displaced in the direction of arrow B, teeth 35 and 36 pull sleeve 64, along with the individual wearing sleeve 64, in the direction of arrow B. Rotating tangs 33 and 34 one-half revolution in the direction indicated by arrow C also causes surfaces 40, 46, 60, and 61 of tangs 33 and 34 to contact sleeve 64. When pole 16 is pulled in the direction of arrow B, surfaces 40, 46, 60 and 61 frictionally engage sleeve 64 to help prevent tangs 33 and 34 from slipping off of and free from sleeve 64. If desired, surfaces 40, 46, 60, and 61 can be provided with an uneven contour, with a sticky adhesive substance or with other means which facilitates the engagement of surfaces 40, 46, 60, and 61 with sleeve 64. Tangs 33 and 34 can be used to engage parts of clothing other than sleeve 64. For instance, tangs 33 and 34 can be slid over and under, respectively, the bottom of a pant leg, the collar of a shirt, the waist line of a pair of pants, the top of a shirt or pants pocket, etc. and then rotated to securely engage fork 32 with the clothing.

Figure 6:
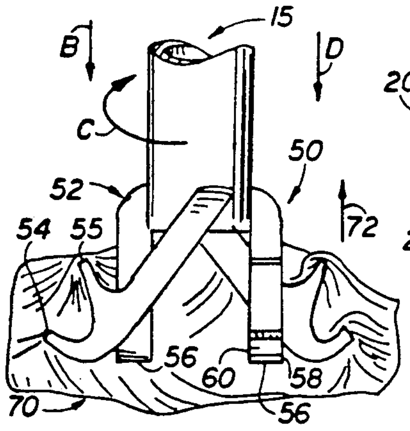
FIG. 6 is a side elevation view illustrating the mode of operation of apparatus constructed in accordance with the invention.

Utilization of the extrication tool of FIG. 12 is illustrated in FIG. 6. The bottom planar arcuate surfaces 56 of feet 50 to 53 are pressed against an area of a shirt, pair of pants, or other piece of clothing worn by an individual. Collar 15 is rotated in the direction of arrow C Rotating collar 15 causes feet 50 to 53 to rotate. When feet 50 to 53 rotate over the surface of the article of clothing 70, edges 58 and/or 60 of feet 50 to 53, along with upwardly projecting teeth 54 and 55, engage clothing 70 and cause clothing 70 to gather around and over teeth 54 and 55. The arcuate shape of edges 58 and 60 facilitates engagement of clothing by feet 50 to 53. Edges 58 and/or 60 dig into and frictionally engage clothing. Portions of planar walls 57 and 59 define the sides of teeth 54 and 55. The sides of the teeth coterminating at the outer tips of teeth 54 and 55 also define edges which dig into and frictionally engage clothing. Such edge engagement of clothing by edges 58 and 60 and by the edges of teeth 54 and 55 is important to the proper functioning of the tool of FIGS. 12 and 13. When the tool of FIG. 12 is rotated in the direction of arrow C in FIG. 6, edges 60 tend to principally initially engage clothing 70, while engagement by trailing edges 58 is minimal or does not occur. If the tool of FIG. 12 is rotated in a direction opposite that of arrow C in FIG. 6, edges 58 tend to principally initially engage clothing 70, while engagement by trailing edges 60 is minimal or does not occur. In a similar manner, the direction of rotation of the tool determines which edges of teeth 54 and 55 tend to principally initially engage clothing 70. The upward projection of teeth 54 and 55 is also important in use of the invention. The upward projection of teeth 54 and 55 tends to prevent clothing from slipping downwardly off of and free from the teeth. Regardless, however, of whether teeth 54 and 55 are upwardly projecting, when the tool is rotated in the direction of arrow C or in the opposing direction, edges 58 and/or 60 initially engage and gather clothing 70 about the feet 50 to 53. Edges 58 and/or 60 can be serrated or roughened to facilitate the engagement of clothing 70 by edges 58 and 60. Edges 58 and 60 are not intended to be cutting edges or to promote the severing of clothing 70. The cutting of clothing 70 by feet 50 to 53 would normally adversely effect the ability of the tool of FIG. 12 to remain engaged with clothing 70. Consequently, teeth 54 and 55 are not pointed in the manner of the pointed tooth or tip of a fish hook. Another reason teeth 54 and 55 are not pointed or sharp is that a sharp tooth might inadvertently impale and injure the individual wearing clothing 70. The tips of teeth 54 and 55 are therefore, as shown in FIGS. 12, 13, and 6, blunted.

Figure 18:
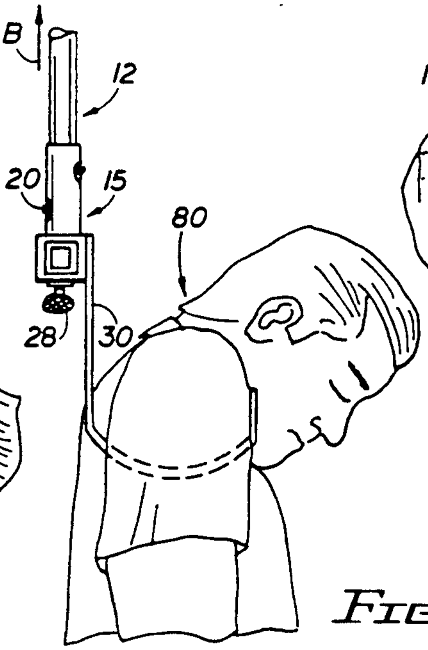

FIG. 18 illustrates utilization of the extrication tool of FIG. 7. U-shaped members 30 and 31 are positioned under the shoulders and arms of an individual. Pole member 12 is displaced in the direction of arrow B to pull individual 80 in the direction of arrow B.

Teeth 54 and 55 of the extrication tool of FIG. 12 extend upwardly away from bottom surfaces 56 toward aperture 18 of collar 15. Teeth 54 and 55 need not, however, extend upwardly toward aperture 18, but may extend in any desired direction and have any desired shape and dimension as long as the teeth 54 and 55 and feet 50 to 53 function, when said teeth and arms are placed against clothing and rotated in the manner depicted in FIG. 6, to gather clothing over said teeth and arms so that the clothing continues to contact and engage teeth 54 and 55 and/or feet 50 to 53 when collar 15 is displaced in the direction of arrow B away from the clothing engaged by teeth 54 and 55. Similarly, teeth 35 and 36 of the tool of FIG. 14 can take on any desired shape, dimension and orientation as long as teeth 35 and 36 continue to engage sleeve 64 when, in FIG. 15, pole 16 is pulled in the direction of arrow B.

While the tool of FIG. 12 includes a plurality of teeth 54 and 55 and feet 50 to 53, one or more of the feet 50 to 53 and teeth 54, 55 can be utilized in the practice of the invention. Similarly, in the tool of FIG. 14 one or more teeth 35 and 36 can, if desired, be utilized to engage the clothing of an individual.

Pole member 12 in FIG. 3 is provided with handles 80 including elongate sloped members 81. Each member 81 is connected to pole 16 and to a member 82. Members 83 are each connected to pole 16 and member 82. When pole 16 is vertically oriented, members 83 function as steps. When pole 16 is displaced or pulled in the direction of arrow D, members 81 facilitate pulling handles 80 past obstacles. When a member 81 contacts an obstacle 90, a lateral force L is generated which tends to push pole 16 away from the obstacle while pole 16 is pulled in the direction of arrow D.

The tool of FIG. 12 must be able to contact, lift and gather a relatively flat piece of clothing (like the portion of a shirt extending over the back or stomach of an individual), must be able to gather clothing on an individual outwardly away from the individual without injuring the person, and must be able to firmly engage the clothing on an individual so the individual can be pulled or lifted while the tool continues to engage and "hold" the clothing. There are a variety of prior art devices which will not perform these functions. Laundry clothes sticks which have a curved or other end centered on the longitudinal axis of the stick tend not to effectively engage, lift, and gather flat pieces of clothing. Such laundry clothes sticks are disclosed in U.S. Pat. Nos. 1,465,175 to Pratt, 2,011,896 to Grace, and 1,457,727 to Crocker. Clothes sticks which, like the stick described in U.S. Pat. No. 1,465,175, have only a single pulling hook tend to concentrate force on clothing at the tip of the hook and to tear the clothing. In contrast to these prior art clothes sticks, the bottom arcuate planar surfaces 56 of feet 50 to 53 are spaced away from the longitudinal centerline 71 of cylindrical collar 15 and are spaced downwardly away from collar 15 so that during rotation of collar 15 in the direction indicated by arrows C in FIGS. 12 and 13, edges 60 move laterally at a greater velocity through an arc of a given length than do points on collar 15. The greater velocity of edges 60 generates friction which facilitates the engagement of edges 60 with a relatively flat piece of clothing which is beneath and simultaneously contacts surface 56 of each foot 50 to 53. When feet 50 to 53 move in the direction of arrow 72 and surfaces 56 frictionally slide over apiece of clothing, edges 60 engage the clothing 70 (FIG. 6) and cause the clothing to gather and lift away from the body of the individual in the direction of arrows 72 in FIGS. 6 and 12. As the clothing 70 gathers and lifts, portions of clothing adjacent but spaced outwardly from feet 50 to 53 and collar 15 are drawn inwardly toward feet 50 to 53 and collar 15 in the same manner that surrounding water is drawn toward a whirlpool in a body of water. Continued rotation of collar 15 in the direction of arrow C causes the clothing 70 to climb and gather, first over the upwardly projecting teeth 54 and then over the upwardly projecting teeth 55 of feet 50 to 53. The engagement of clothing 70 by multiple teeth 54, 55 distributes the force exerted on the clothing when collar 15 is pulled away from the clothing in the direction of arrow B in FIG. 6. Distributing the force exerted on the clothing makes it less likely the clothing will tear. The spaced apart arms 50 to 53 also engage a significant amount of clothing and tend to distribute over a larger amount of clothing the pulling force exerted by feet 50 to 53 on the clothing when collar 15 is pulled in the direction of arrow B.

The positioning of surface 56 away from the centerline 71 of collar 15 enables edges 60 to generate a frictional force sufficient to gather clothing 70 without requiring that a large downward force D be exerted on collar 15 to produce friction between surfaces 56 and clothing 70. A large downward force D could cause injury to the person wearing the clothing.

Surfaces 56 are arcuate and planar. A planar surface can be flat or arcuate, as indicated in the definition of plane found in the 1987 edition of the World Book Dictionary. For purposes herein, a plane shall encompass any surface which enables a straight line to be wholly contained in the surface if the straight line and the two points which the line interconnects are placed on the surface in at least one selected orientation. Accordingly, the surface of a sphere would not be planar, but the surface of a cylinder would be planar.

Each leg in leg-pair 51, 53 extends perpendicular and at an angle to each leg in leg-pair 50, 52. When collar 15 is rotated, the edges 60 on leg-pair 51, 53 pull on clothing in lateral directions F, G which are generally perpendicular to the lateral directions E, H in which edges 60 in leg-pair 50, 52 pull on the clothing. This is an important feature of the invention because the clothing worn by a person is sometimes more readily gathered when pulled in a first direction than when the clothing is pulled in a second direction.

Having described my invention in such terms as to enable those skilled in the art to understand and practice it, and having identified the presently preferred embodiments thereof, I claim:

1. Apparatus for applying from a first location a pulling force on clothing worn on an individual at a second location, said clothing having a generally flat portion, said apparatus including (a) an elongate member (16) having a longitudinal axis (71) and extending from said first location toward said second location and including (i) a first end at said first location, and (ii) a second end (15) adjacent said second location;

(b) clothing engagement means attached to said second end and including at least a pair of spaced apart contact feed (50, 52) extending outwardly away from said second end (15) and said first end, each of said feet including (i) a bottom surface (56) for contacting said flat portion of said clothing, and (ii) at least one side surface (59) extending away from said bottom surface generally toward said second end and coterminating with said bottom surface (56) to form a clothing-engaging edge (60), said side surface and clothing-engaging edge moving laterally around said longitudinal axis (71) and bearing against and frictionally engaging said clothing when said elongate member and said clothing engagement means ar rotated, said edge (60) and side surface (59) extending at an angle with respect to said longitudinal axis (71) of said elongate member (16), said edge being generally parallel to clothing contacting said bottom surface (56);

(c) means for rotating said elongate member and said clothing engagement means and for pressing said bottom surfaces (56) of said feet against said clothing;

said edges frictionally engaging and gathering said flat portion of said clothing and causing said clothing to climb outwardly away from said individual toward said second end of said elongate member (16) and up and over said feet when (d) said bottom surfaces (56) of said feet (50, 52) are pressed against said flat portion of said clothing with said longitudinal axis (71) perpendicular to said flat portion, and (e) said elongate member and feet are rotated about said longitudinal axis.

2. The apparatus of claim 1 where each of said feet includes at least one tooth which projects outwardly away from said bottom surface and said clothing when said bottom surfaces contact said clothing.

3. The apparatus of claim 2 wherein said bottom surfaces are arcuate and planar in shape.

4. The apparatus of claim 2 wherein said tooth includes a blunted tip.

* * * * *